US010980217B1

(12) United States Patent
Morgan

(10) Patent No.: US 10,980,217 B1
(45) Date of Patent: Apr. 20, 2021

(54) PADDED ANTI-COLLISION BUMPER COLLAR FOR BLIND ANIMALS

(71) Applicant: Tonya Lee Morgan, Kingman, AZ (US)

(72) Inventor: Tonya Lee Morgan, Kingman, AZ (US)

(*) Notice: Subject to any disclaimer, the term of this patent is extended or adjusted under 35 U.S.C. 154(b) by 286 days.

(21) Appl. No.: 16/018,310

(22) Filed: Jun. 26, 2018

Related U.S. Application Data

(60) Provisional application No. 62/604,444, filed on Jul. 7, 2017.

(51) Int. Cl.
A01K 27/00 (2006.01)
A01K 13/00 (2006.01)

(52) U.S. Cl.
CPC .......... A01K 27/001 (2013.01); A01K 13/006 (2013.01)

(58) Field of Classification Search
CPC .............................. A01K 13/006; A01K 27/001
See application file for complete search history.

(56) References Cited

U.S. PATENT DOCUMENTS

| 2,513,969 | A  | * | 7/1950  | Rose    | A01K 13/006 |
|           |    |   |         |         | 119/850     |
| 6,367,424 | B1 | * | 4/2002  | Higham  | A01K 13/006 |
|           |    |   |         |         | 119/766     |
| 8,707,909 | B2 | * | 4/2014  | Bordeaux| A01K 13/006 |
|           |    |   |         |         | 119/850     |
| 2005/0284419 | A1 | * | 12/2005 | Bazar   | A01K 27/001 |
|           |    |   |         |         | 119/856     |
| 2006/0236956 | A1 | * | 10/2006 | Lord    | A01K 27/001 |
|           |    |   |         |         | 119/794     |
| 2006/0278177 | A1 | * | 12/2006 | Crawford| A01K 13/006 |
|           |    |   |         |         | 119/850     |
| 2007/0034165 | A1 | * | 2/2007  | Yang    | A01K 27/009 |
|           |    |   |         |         | 119/863     |

(Continued)

FOREIGN PATENT DOCUMENTS

KR  1775562 B1 * 9/2017 ........... A01K 13/006

OTHER PUBLICATIONS

YouTube video titled "Blind Dog Bumper Collar" by Ron Londen, published Nov. 25, 2016, and available at https://www.youtube.com/watch?v=WC3TcEqwwl4.*

(Continued)

Primary Examiner — Blake A Tankersley

(57) ABSTRACT

This Padded Anti-Collision Bumper Collar provides blind dogs/animals a durable and comfortable apparatus that gives them more confidence to move around freely. The protective face hoop guard guides them around obstacles and helps to prevent face injuries. The structured collar is covered with fake fur padding to eliminate any irritation to the neck or throat. The protective face hoop guard is fully adjustable, and can be set at the correct height and shape around the animal's head. This anti-collision bumper collar utilizes a "bottom-weight balanced" design to keep the hoop level, and a plastic pinch-release buckle closure makes this Padded Anti-Collision Bumper Collar easy on/easy off! This invention offers a simple collar design, everything else currently on the market has harness or vest contraptions, which seem bulky and uncomfortable. Most importantly, this invention works as intended—most dogs adjust to it right away!

5 Claims, 4 Drawing Sheets

(56) References Cited

U.S. PATENT DOCUMENTS

2014/0069351 A1* 3/2014 Stratton .............. A01K 13/006
119/850

OTHER PUBLICATIONS

YouTube video titled "Blind Dog Bumper Collar red heeler" by Blind Dog Bumper Collar, published Aug. 8, 2016, and available at https://www.youtube.com/watch?v=8KKi5Cf4QmA.*

YouTube video titled "Blind Dog Collar" by Blind Dog Collar, published Jan. 1, 2016, and available at https://www.youtube.com/watch?v=A_iqbwF2ImM.*

* cited by examiner

PADDED ANTI-COLLISION BUMPER COLLAR FOR BLIND ANIMALS

BACKGROUND OF INVENTION

When I created this item for blinds dogs/animals, I originally used some miscellaneous parts I had in my garage and around the house to work out the logistics of the collar to make it fit properly and to make it function properly. It took a few tries to work out the details, but I made a Padded Anti-collision Bumper Collar for my dog, and it changed her life! She wore that collar for a long time until she passed. That collar was the proto-type for my current invention. I had to figure the size scale that would range from very tiny mini dogs/animals, to the larger dogs/animals) so I could make these and be sure I was accurately sizing them for the public. Then I had to find suitable supplies that were abrasive resistant, durable and washable. During 2016 I purchased small sample orders from local and online manufacturers to find the correct parts to make my invention. Some products I purchased were NOT suitable and I continued to search until I found what I needed to make the Padded Anti-Collision Bumper Collar. The common law trademark name for this invention is Blind Dog Bumper Collar. The invention uses durable parts, is resistant to wear and tear and can easily be cleaned. It's comfortable for the animal to wear, it helps protect their eyes, nose and face from injuries, and provides gentle mobility guidance. Most importantly, this invention works as intended and there is nothing like it on the market.

SUMMARY OF INVENTION

This padded anti-collision bumper collar gives blind dogs/animals the confidence to move around freely. The protective face hoop guard guides them around obstacles and also helps to prevent eye, nose and face injuries. The collar has a durable, structured base. The structured collar is covered with soft, fake fur padding to eliminate any irritation to the neck or throat, and makes it very comfortable to wear. The protective face hoop is made from plastic tubing with wire inside, so the hoop is fully adjustable, and the hoop can be set at the correct height level and shape around the animal's head. This hoop is permanently attached with adhesive. A plastic pinch-release buckle closure makes this Padded Anti-Collision Bumper Collar easy on/easy off! The smaller sizes are made with smaller, lighter, thinner parts and increase accordingly as the collar size increases.

BRIEF DESCRIPTIONS OF THE SEVERAL VIEWS OF DRAWINGS

Figure 1:
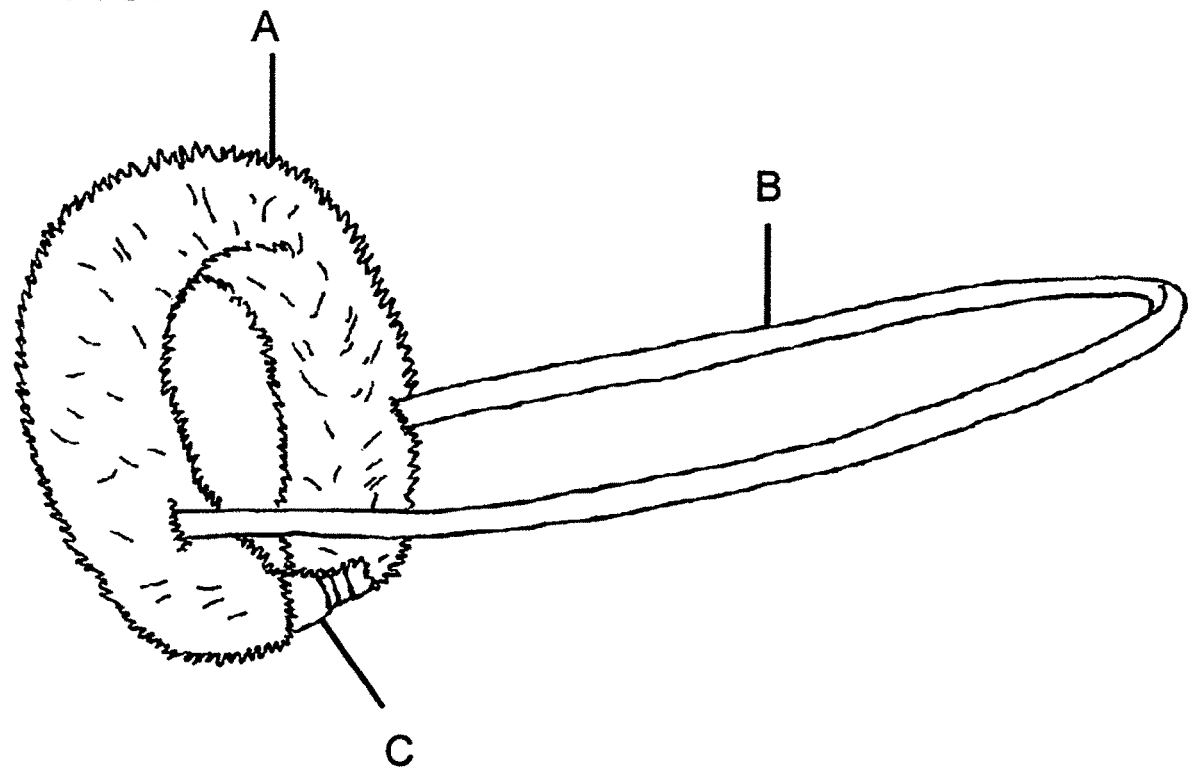
FIG. 1 is a perspective side view of the fully assembled padded anti-collision bumper collar.
Figure 2:
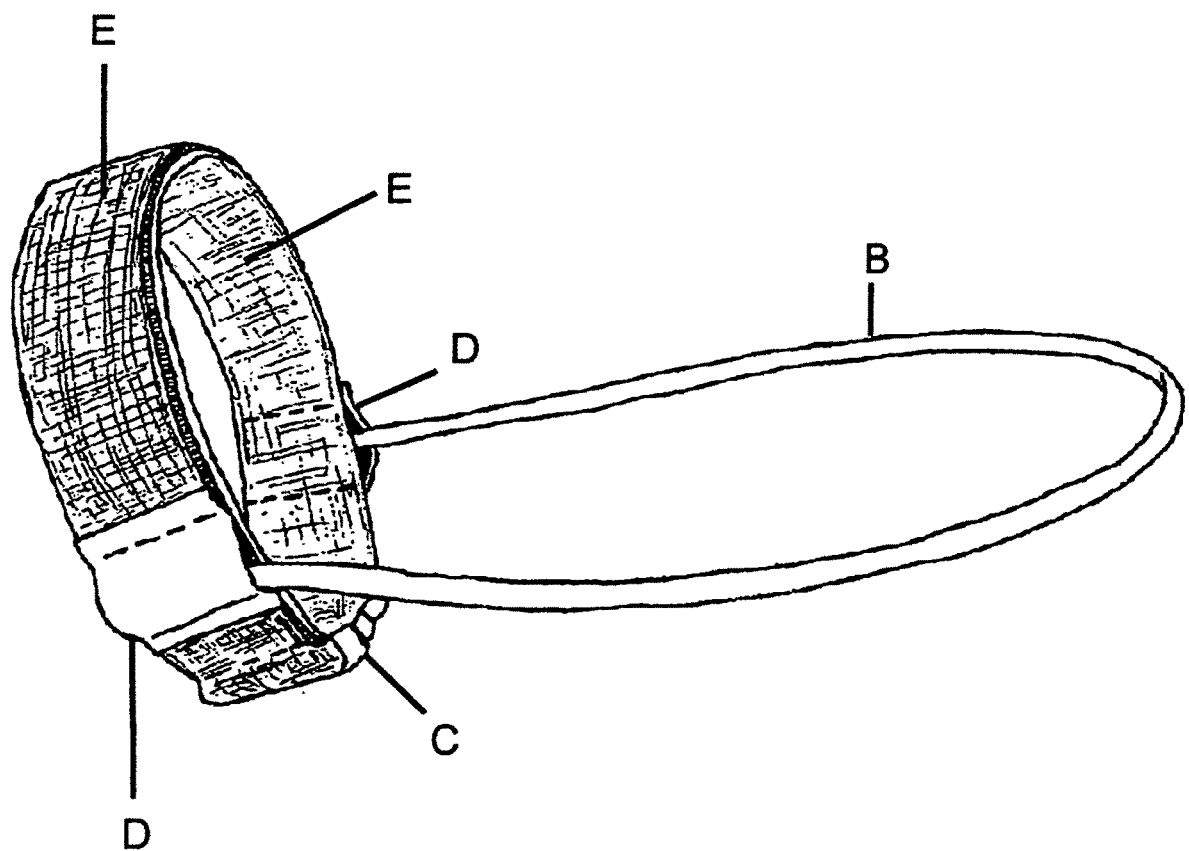
FIG. 2 is a side view of the padded anti-collision bumper collar, with the fake fur padding cover removed to illustrate the assembly of the collar, specifically the protective face guard hoop embedded in the leather channels.
Figure 3:
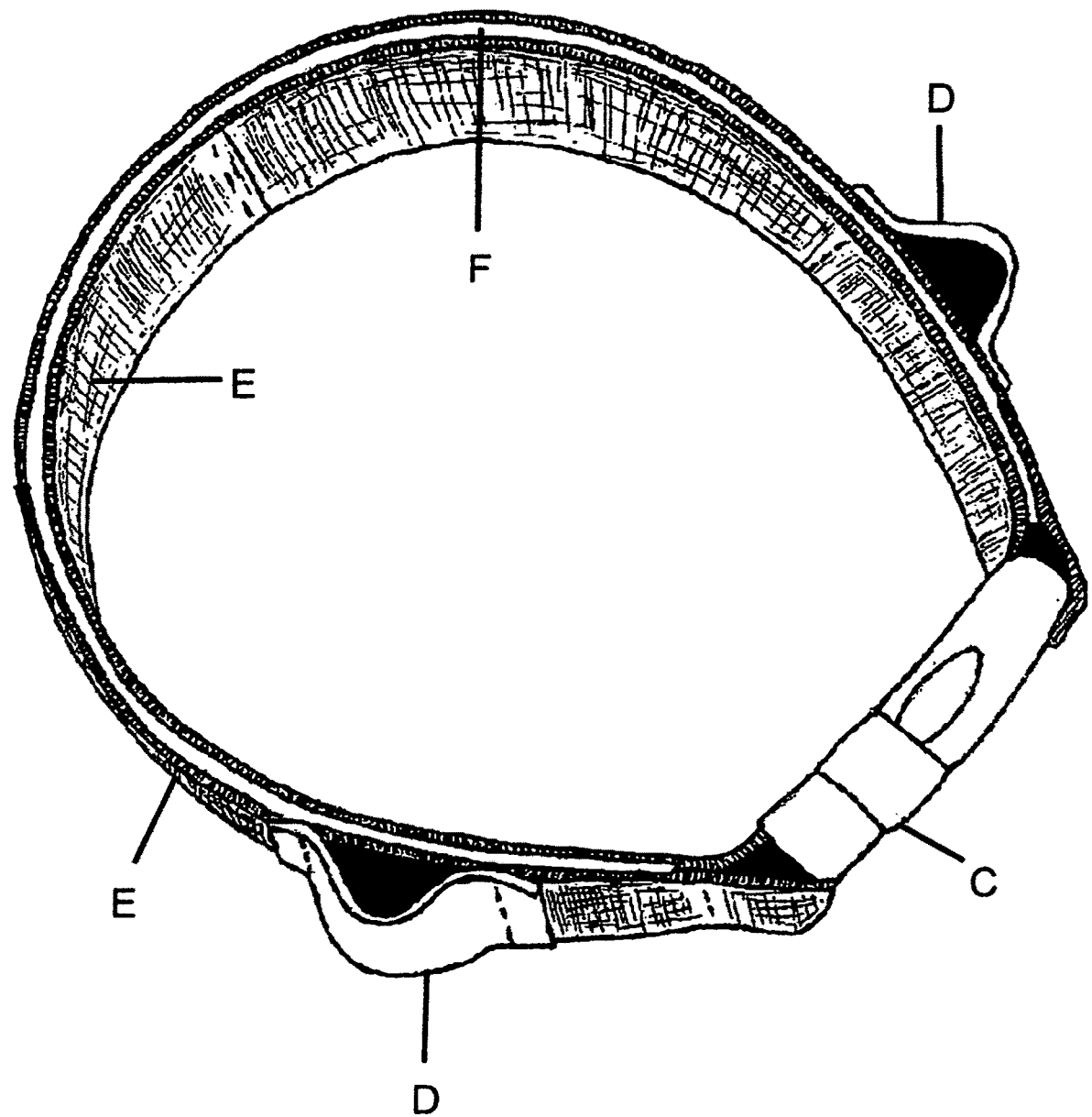

FIG. 3 is an enlarged front view of the partially assembled padded anti-collision bumper collar with the pinch-release buckle closure in the closed position, with the fake fur padding and protective face guard hoop both removed, to show the structure of the collar, a layer of reinforcement plastic sandwiched between the outer and inner layers of webbing, and the leather side channels devised for placement of the face guard hoop and adhesive.

Figures 4, 5:
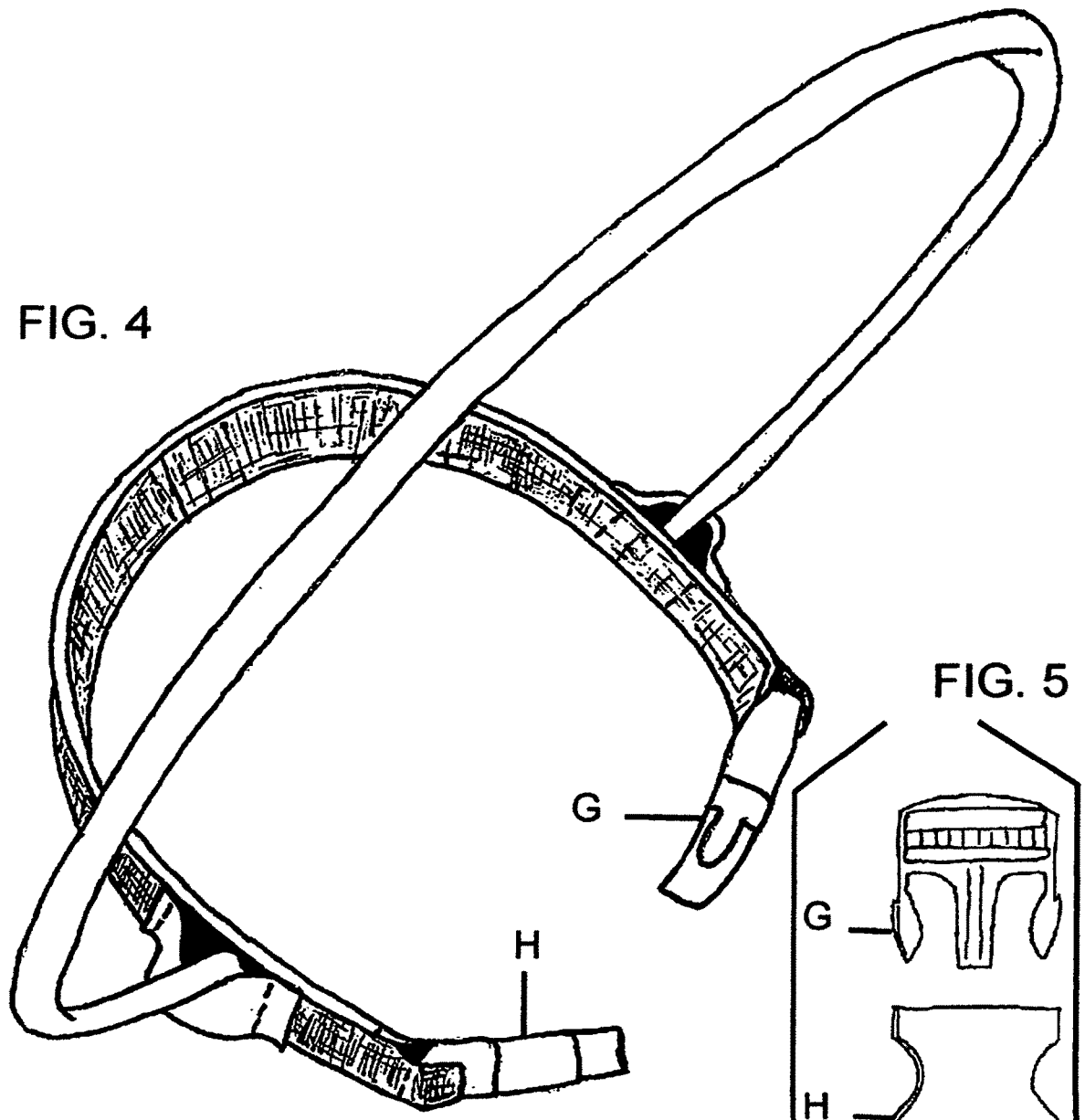

FIG. 4 is a front view of the padded anti-collision bumper collar, with the fake fur padding removed to demonstrate the hoop placement in the leather channels on each side of the collar,
and the pinch-release buckle closure in the open position.

FIG. 5 is an exploded view of the plastic pinch-release buckle closure in the open position.

DETAILED DESCRIPTION OF INVENTION

This Padded Anti-Collision Bumper Collar gives your blind pet or animal the confidence to move around freely, the protective face hoop guard guides them around obstacles, and also helps to prevent eye, nose and face injuries. Most dogs adjust to it right away. Dogs quickly realize the protective face hoop prevents them from bumping their face and nose, which gives them more confidence to move around. This collar does NOT interfere with a dog's ability to eat, drink, sleep, play, or to navigate doggie doors or steps.

The collar has a layer of plastic in between the two layers of strap webbing, which provides a durable, structured base. The structure is covered with soft, fake fur padding to eliminate any irritation to the neck or throat, and it makes it very comfortable to wear. The fake fur padding is also key to the design, it helps to keep the collar and protective face hoop level. A collar made without any fake fur padding will just spin around the neck. The protective face hoop is made from plastic tubing with wire inside, so the hoop is fully adjustable, and the hoop can be set at the correct height level and shape around the animal's head. This hoop is attached to both sides of the collar structure, embedded into leather channels, where they are permanently attached with adhesive. This collar is designed to be worn with the buckle under the neck, and "bottom-weight balanced" design helps to to keep the collar balanced. The "bottom-weight balanced" design is achieved by locating the pinch buckle and the two leather channels all below the lower half of the collar. A plastic pinch-release buckle closure makes this Padded Anti-Collision Bumper Collar easy on/easy off!

These collars can be easily washed in soapy water. They dry very quickly, and a simple brush will "fluff" out the fake fur. This same design is duplicated in sizes from very small to very large. The size variations allow for the plastic pinch-release buckle closures to vary in size, the strap webbing and inner plastic layer in various widths, the plastic hoop tubing in various diameters, the wire inside the tubing in various gauges and strength, the plastic insert that provides collar structure, in various thicknesses, according to the size of the collar. The smaller sizes are made with smaller, lighter, thinner parts and increase accordingly as the collar size increases. The design includes variations allowed for different colors of tubing for the face guard hoop. The design allows for different colors, thicknesses, densities and pile lengths of the fake fur that covers the collar structure. The design also allows for custom orders that require a smaller hoop. (example: a short-muzzled dog, like a pug, would do better with a smaller face guard hoop).

There are currently other options on the market for blind dogs/animals, but ALL of them utilize a harness or vest design. This is the only invention that is a simple, padded, comfortable collar with a fully adjustable, permanently attached protective face hoop guard.

DRAWINGS USE THE ENGLISH ALPHABET AS THE REFERENCE CHARACTERS

A—fake fur padding which covers the entire length of the collar, excluding the pinch-release buckle closure.

B—protective face hoop guard is plastic hoop tubing which has wire inside it, so the hoop can be set at the correct height level and shape around the animal's head.
C—pinch-release buckle closure.
D—leather channels on both sides of the collar. The protective face hoop guard is attached to both sides of the collar structure, embedded into these leather channels, where they are permanently attached with adhesive.
E—strap webbing.
F—plastic layer in between the two layers of strap webbing. This gives the collar the durability and strength to support the protective face hoop guard.
G—"male" end of the plastic pinch-release buckle closure.
H—"female" end of the plastic pinch-release buckle closure.

The invention claimed is:

1. A padded anti-collision bumper collar for a blind animal comprising:

A multi-layered collar having an inner layer of plastic sandwiched between outer layers of webbing, fake fur padding which extends all the way around the multi-layered collar such that when the padded anti-collision bumper collar is placed around the animal's neck, the fake fur padding provides a non-skid surface that helps keep the padded anti-collision bumper collar from spinning; and a face guard hoop which is attached to and extends from the multi-layered collar such that when the padded anti-collision bumper collar is placed around the animal's neck, the face guard hoop extends in front of the animal's face and guards the face of the animal, wherein the inner layer of plastic provides durability and strength to prevent the face guard hoop from sagging down when the padded anti-collision bumper collar is placed around the animal's neck.

2. The padded anti-collision bumper collar according to claim 1, further comprising a pinch-release buckle closure which is able to connect two ends of the multi-layered collar.

3. The padded anti-collision bumper collar according to claim 1, wherein the face guard hoop comprises a guard tubing and wire inside the guard tubing.

4. The padded anti-collision bumper collar according to claim 1, further comprising leather channels on left and right sides of the multi-layered collar, wherein the face guard hoop is attached to the multi-layered collar using the leather channels.

5. The padded anti-collision bumper collar according to claim 4, wherein the leather channels, face guard hoop and a pinch-release buckle closure are placed and attached below a bottom half of the padded anti-collision bumper collar such that when the padded anti-collision bumper collar is placed around a blind animal's neck, the weight of the leather channels, face guard hoop and pinch-release buckle closure will lower a center of gravity of the padded anti-collision bumper collar and prevent the padded anti-collision bumper collar from spinning.

* * * * *